(12) United States Patent
Heinritz-Adrian et al.

(10) Patent No.: US 8,932,375 B2
(45) Date of Patent: Jan. 13, 2015

(54) METHOD FOR SUPPLYING AN ENTRAINED-FLOW GASIFICATION REACTOR WITH CARBONACEOUS FUELS

(75) Inventors: Max Heinritz-Adrian, Muenster (DE); Johannes Kowoll, Bochum (DE); Stefan Hamel, Wenden (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 424 days.

(21) Appl. No.: 13/389,870

(22) PCT Filed: Aug. 10, 2010

(86) PCT No.: PCT/EP2010/004854
§ 371 (c)(1),
(2), (4) Date: Feb. 10, 2012

(87) PCT Pub. No.: WO2011/018198
PCT Pub. Date: Feb. 17, 2011

(65) Prior Publication Data
US 2012/0137583 A1 Jun. 7, 2012

(30) Foreign Application Priority Data
Aug. 12, 2009 (DE) .......... 10 2009 036 973

(51) Int. Cl.
*C01B 3/36* (2006.01)
*C10J 3/50* (2006.01)
(Continued)

(52) U.S. Cl.
CPC . *C10J 3/506* (2013.01); *C10G 2/32* (2013.01);
*C10J 3/466* (2013.01); *C10K 3/04* (2013.01);
*C10K 1/004* (2013.01); *C10K 1/005* (2013.01);
*C10J 2200/15* (2013.01);
(Continued)

(58) Field of Classification Search
CPC ............... C10J 3/84; C10J 2300/1659; C10J 2300/1807; C10J 3/00; C10J 3/485; C10J 3/506; C10J 2300/1823; C10J 2300/0989; C10J 2300/16; C10J 3/466; C10J 3/526; C10J 3/66; C10K 1/004; C10K 1/005
See application file for complete search history.

(56) References Cited

U.S. PATENT DOCUMENTS 5,132,007 A 7/1992 Meyer et al.
6,991,769 B2 1/2006 Kaneko et al.
(Continued)

FOREIGN PATENT DOCUMENTS

CA 2 750 927 8/2010
DE 10 2007 020 333 11/2008
(Continued)

OTHER PUBLICATIONS

International Search Report of PCT/EP2010/004854, date of mailing May 16, 2011.

*Primary Examiner* — Imran Akram
(74) *Attorney, Agent, or Firm* — Collard & Roe, P.C.

(57) ABSTRACT

With a method for supplying an entrained-flow gasification reactor with carbonaceous fuel for the production of a gas that contains CO and $H_2$ and flue ash under pressure and at a temperature above the melting point of the ash, wherein the resulting gas is passed to further treatment stages, particularly at least one synthesis stage, the waste gas that is derived from the subsequent treatment stage and still contains hydrocarbons and/or hydrogen is used for pneumatic conveying of the fuel into the entrained-flow gasification reactor.

3 Claims, 1 Drawing Sheet

(51) Int. Cl.
*C10G 2/00* (2006.01)
*C10J 3/46* (2006.01)
*C10K 3/04* (2006.01)
*C10K 1/00* (2006.01)

(52) U.S. Cl.
CPC . *C10J 2300/0933* (2013.01); *C10J 2300/0936* (2013.01); *C10J 2300/1659* (2013.01); *C10J 2300/1665* (2013.01); *C10J 2300/1807* (2013.01); *C10J 2300/1815* (2013.01); *C10J 2200/156* (2013.01); *C10G 2300/207* (2013.01); *C10G 2300/4081* (2013.01); *C10G 2400/02* (2013.01)
USPC .................................................... 48/197 R

(56) References Cited

U.S. PATENT DOCUMENTS

| | | | |
|---|---|---|---|
| 2002/0159929 A1 | 10/2002 | Kaneko et al. | |
| 2004/0052724 A1* | 3/2004 | Sorace | 423/648.1 |
| 2006/0228284 A1* | 10/2006 | Schmidt | 423/352 |
| 2007/0256360 A1* | 11/2007 | Kindig et al. | 48/197 A |
| 2007/0256361 A1* | 11/2007 | Kindig | 48/197 R |
| 2008/0056971 A1* | 3/2008 | Hughes | 423/220 |
| 2008/0115415 A1* | 5/2008 | Agrawal et al. | 48/101 |
| 2008/0141591 A1* | 6/2008 | Kohl | 48/197 R |
| 2008/0141672 A1* | 6/2008 | Shah et al. | 60/648 |
| 2008/0155899 A1* | 7/2008 | Ramamurthy | 48/77 |
| 2008/0202985 A1* | 8/2008 | Hatfield et al. | 208/403 |
| 2008/0210089 A1* | 9/2008 | Tsangaris et al. | 95/90 |
| 2009/0056225 A1 | 3/2009 | Schinski | |
| 2009/0056537 A1* | 3/2009 | Neumann | 95/35 |
| 2009/0094893 A1* | 4/2009 | Neumann | 48/62 R |
| 2009/0107046 A1* | 4/2009 | Leininger et al. | 48/86 R |
| 2009/0126259 A1 | 5/2009 | Den Berg et al. | |
| 2009/0152208 A1 | 6/2009 | Agrawal | |
| 2009/0159496 A1* | 6/2009 | Hedrick | 208/67 |
| 2010/0147413 A1 | 6/2010 | Schingnitz et al. | |

FOREIGN PATENT DOCUMENTS

| | | |
|---|---|---|
| DE | 10 2009 006 384 | 8/2010 |
| EP | 0 333 991 | 9/1989 |
| EP | 1 205 532 | 5/2002 |

* cited by examiner

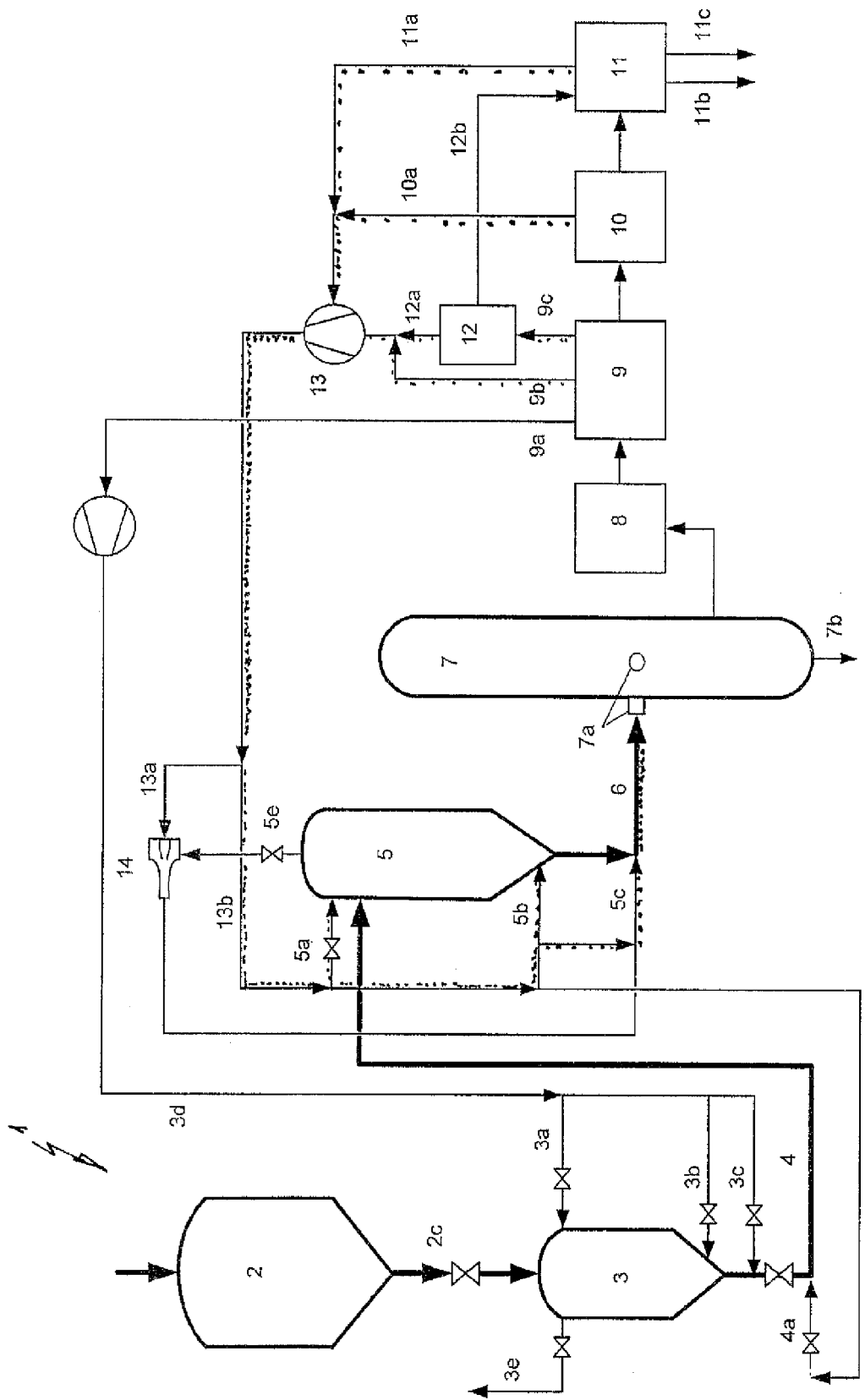

METHOD FOR SUPPLYING AN ENTRAINED-FLOW GASIFICATION REACTOR WITH CARBONACEOUS FUELS

CROSS REFERENCE TO RELATED APPLICATIONS

This application is the National Stage of PCT/EP2010/004854 filed on Aug. 10, 2010, which claims priority under 35 U.S.C. §119 of German Application No. 10 2009 036 973.2 filed on Aug. 12, 2009, the disclosure of which is incorporated by references. The international application under PCT article 21(2) was not published in English.

The invention is directed at a method for supplying an entrained-flow gasification reactor with carbonaceous fuels for the production of a gas that contains CO and $H_2$ and flue ash under pressure and at a temperature above the melting temperature of the ash, whereby the resulting gas is passed to further treatment stages, particularly at least one synthesis stage.

In the transfer and feed of fine-grained to dust-form fuel with a gas that contains carbon dioxide, carbon monoxide, and oxygen, in an entrained-flow gasifier that is under pressure, in which finely divided or dust-form (<0.5 mm) fuels, for example coal, petcoke, biological wastes or fuels, are reacted with gasification agents that contain oxygen, in suspension, at a low particle charge (<50 kg/m$^3$), at elevated pressure up to 10 MPa, at temperatures above the slag melting point, the gas that contains oxygen is supplied at a substoichiometric ratio, so that a product gas that contains carbon monoxide is produced. With regard to the state of the art, EP 0 333 991 A1 or DE 10 2007 020 333 A1 are mentioned as examples here.

Since the fuel is at first present under ambient pressure, it must first be brought to a pressure level above the reactor pressure, by way of the feed system, in order to then be transported to the burners of the pressurized gasification reactor in metered manner.

An advantageous method provides that the fuel is conveyed from a storage container into transfer containers. These are first pressurized to a pressure level above the reactor pressure, in order to then convey the fuel into a feed container for the burners of the gasification reactor, which is permanently under pressure, by way of a conveying line, by means of dense-stream conveying. From this feed container, the burners are continuously supplied with a metered fuel mass stream, in each instance. The transport gas required to convey the dense stream is supplied in or in the vicinity of the outlet of the transfer container, or in the conveying line. The emptied transfer containers are then relaxed, in order to be able to take up another fuel batch, under approximately atmospheric pressure. The relaxation gas is deducted and released into the atmosphere.

Usually, nitrogen from an air separation system or carbon dioxide is used for the transfer. Carbon dioxide is used if the gas to be produced is a synthesis gas low in nitrogen, or hydrogen, and/or CO.

Carbon dioxide can be obtained in the gas treatment that follows gasification. Frequently, the gas that flows out of the gasifier is deducted and cleaned and subjected to CO conversion, in order to set the $H_2$/CO ratio required by the synthesis, or in order to produce pure hydrogen. In this connection, CO and steam are converted to $CO_2$ and hydrogen. Afterwards, the gas is cooled, the moisture is condensed out, and subsequently, $CO_2$ is washed out in a washing process with circulating solvent, for example MDEa, Genosorb, or methanol. In a desorber, the $CO_2$ is driven out of the solution by means of lowering the pressure or increasing the temperature.

The gas obtained in this manner contains not only the $CO_2$ but also other components, for example $H_2$, CO, $N_2$, methane, hydrogen sulfide, argon, vapors of the solvent used, for example methanol, among other things. The CO content amounts to 0.1%, for example. While it is possible to further lower the content of the pollutants in the washing process, the expenditure (investment costs and operating costs, for example for steam and current consumption) rapidly increases with increasing purity requirements.

DE 10 2007 020 333 A1 describes a method for operation of a dust introduction system for pressurized coal dust gasification, which comprises a storage bunker, dust introduction transfer mechanisms, and a metering vessel. In this connection, heated nitrogen is passed to the bunker, as an inertization and loosening agent, while pressurization of the transfer container and conveying of the dust takes place with pure $CO_2$. The relaxation gas from the transfer container is relaxed and then freed of solids in a filter. In this connection, emptying of the relaxed transfer container into the metering vessel takes place by means of gravity flow.

Disadvantages of the known solutions consist, among other things, in that the gas used for transfer and fluidization is allowed to contain only a low concentration of the environmental pollutants CO, $H_2S$, methanol, and others, because it is released into the atmosphere. The transfer based on gravity flow, with the construction of one container on top of another, is complicated because of the great construction height, and has proven to be insufficiently operationally reliable due to compacting of the bulk material. Despite many, extremely varied approaches, it has proven to be extremely difficult to carry out the process of container relaxation in such a gentle manner that internal stresses in the bulk material are kept sufficiently low.

In order to make available a method for supplying fuel to a pressure gasification system, which fuel supply ensures, in efficient manner, that emissions of pollutants from coal transfer and transport are minimized or completely avoided, the document DE 10 2009 006 384 of the applicant, which is not a prior publication, proposes, among other things, that the fuel is conveyed from a storage container into the transfer container, by means of specific gas mixtures.

In order to appropriately treat pollutants with which the conveying gases are contaminated, for example CO, methane, hydrogen sulfide, vapors of the solvent used, for example methanol, etc., before they are released into the atmosphere, it is proposed, in this application, to mix the carbon dioxide with oxygen as a transfer transport gas, and to oxidize it catalytically.

The purified synthesis gas can be used for synthesis of the liquid hydrocarbons, for example using the Fischer-Tropsch method or using the MTG (methanol to gasoline) method, in the first step of which methanol is produced, which is converted to gasoline in the second step. In both methods, gaseous byproducts are formed, which consist predominantly of hydrocarbons. In both methods, hydrogen is necessary for treating the liquid products; this is produced, for example, by means of separation in a PSA system (pressure swing absorption), whereby a residual gas is formed that contains predominantly CO and $H_2$.

State of the MTG art: A part of the gaseous byproducts is discontinuously used for regeneration of the MTG catalyst; the excess is exported. In the case of a small number of MTG reactors, the gas is collected, in order to be able to produce sufficient heating power during regeneration. Disadvantages: Collection container required, demand differs from production, carbon is released into the atmosphere as $CO_2$ instead of being bound into the products.

The fundamental advantage of recirculation of the byproducts, that of increasing the yield of the liquid products, is known, but compression and recirculation of the gaseous byproducts is problematical:

The amount is generally too small for a rotating radial or axial compressor, but in contrast, piston compressors have a maintenance requirement that is many times greater, the composition and the amounts vary. Because hydrocarbons have a density that is many times greater than that of hydrogen ($CH_4$ 8x, $C_5H_{12}$ 36x) and a lower isentropic coefficient, the properties of the mixture vary, and with them also the exit pressure of a rotating compressor. In the case of a temporarily elevated hydrogen proportion and thus a lower density of the gas, a rotating compressor yields a clearly reduced pressure that can be too low for feeding the gas into the gasifier, a part of the hydrocarbons condenses when compressed, a feed-in channel is required in the gasifier, which channel must be flushed when the byproducts are not present.

It is the task of the present invention to increase the yield of the liquid products, in cost-advantageous and simple manner.

This task is accomplished, according to the invention, with a method of the type indicated initially, in that the waste gas that is derived from the subsequent treatment stage and still contains hydrocarbons and/or hydrogen is used for pneumatic conveying of the fuel into the entrained-flow gasification reactor.

Further embodiments of the invention are evident from the dependent claims. In this connection, it can particularly be provided that the further treatment stages are formed by a CO conversion stage, a gas purification stage, and a first synthesis stage, for example for methanol synthesis, and a second synthesis stage, for example an MTG (methanol to gasoline) stage, whereby the recirculated gases contain at least 1 vol.-% of the hydrocarbons and/or 1 vol.-% of the hydrogen.

The advantages of the invention lie in the fact, among other things, that the gaseous or evaporated byproducts of the syntheses (for example of the methanol synthesis and the MTG synthesis) are mixed with carbon dioxide ($CO_2$), thereby increasing the gas amount and stabilizing the properties of the gas, so that a rotating compressor can be used. The amount of the carbon dioxide is selected in such a manner that condensation of the hydrocarbons during compression is avoided. A $CO_2$ fraction charged with pollutants can be used in this connection, whereby the $CO_2$ treatment that is usually required can be eliminated.

Another advantage consists in that the compressed gas mixture is used for dilution of the solid fuel conveyed into the gasifier, instead of a pure conveying gas, whereby in addition, the mixture can also be used for conveying the fuel out of the transfer container into the feed container, whereby recirculation of the relaxation gases is preferably used with an injector, in order to avoid release of the gases that contain $H_2$, CO, and hydrocarbons.

The invention also provides that the gases recirculated from the subsequent systems are mixed with $CO_2$ before being compressed.

In an embodiment, it is also provided that a gas obtained during the gas treatment, which contains predominantly $CO_2$ and at least 10 ppm $H_2S$ and/or CO, is mixed into the recirculated gas that contains hydrocarbon and/or hydrogen, whereby it can also be provided that the recirculated gas is used at least in part for conveying the fuel in a feed container, for building up pressure in the feed container and/or for fluidization of the fuel in the feed container.

Additional advantages, details, and characteristics of the invention are evident from the following description and using the drawing. This shows a schematic of the gasification method according to the invention.

In a system indicated in general with 1, the dust-form fuel is transferred from a storage container 2, by way of the connection line 2c, to the transfer containers 3. In order to be able to take up fuel, the transfer containers 3 must first be relaxed. The gas 3e that flows out of the transfer containers is de-dusted and released into the atmosphere. Then, the transfer units are filled with fuel and pressure is applied with gas 3a and 3b. Afterward, the exit line of the transfer unit is flushed with 3c and the dust-form fuel is conveyed from the transfer container 3, by way of the line 4, into the feed container 5. In this connection, loosening and fluidization gas 3b and transport gas 4a are added. The feed container 5 is permanently at operating pressure and continuously supplies the gasifier 7 by way of multiple lines 6.

Conveying out of the feed container takes place by means of adding loosening and fluidization gas 5b in the exit region of the container and by means of additional transport gas 5c in the burner line 6. The fuel stream 6 is transported into the gasification unit 7 by way of burner(s) 7a, continuously and pneumatically regulated, preferably by means of dense-stream conveying. The relaxation gas 5e is recirculated from the feed container with an injector 14.

The gasification unit 7 comprises a gasification reactor, a gas cooling and de-dusting unit, and a cooling and discharge unit for the slag 7b and the water that contains solids. In the CO conversion unit 8, part of the carbon monoxide and of the steam are converted to carbon dioxide and hydrogen. Afterward, the gas is cleaned with a solvent (for example methanol) in the gas purification unit 9, and carbon dioxide is separated from the synthesis gas (predominantly $H_2$ and CO). The gas that contains carbon dioxide and was obtained in the gas purification unit has a low pressure and generally contains slight proportions of pollutants, such as, for example, carbon monoxide <1%, hydrogen sulfide <10 ppmv, and traces of hydrocarbons. The carbon dioxide that is obtained can have one or more grades.

The FIGURE shows a low-pollutant $CO_2$ streams 9a and a stream 9b charged with pollutants. Usually, the amount of $CO_2$ washed out is greater than the demand of the solids transfer unit and conveying unit, so that further $CO_2$ streams leave the gas purification unit 9. The purified synthesis gas is converted to methanol in 10 and to gasoline 11b and LPG 11c in the MTG synthesis unit 11. Frequently, hydrogen is required for treatment of the liquid products; this is obtained in 12 by means of separation using the PSA method, for example. The byproducts 11a, relaxation gases 10a, and the residual gas 12a are fed into suitable pressure stages of the compressor 13, and recirculated by way of the streams 13a and 13b, respectively, according to the invention. These streams are indicated with an additional dotted line.

An imported gas is required for startup of the system as a whole, for example $CO_2$ or nitrogen. Frequently, the use of nitrogen is preferred, which can be kept on hand in the liquid phase for this purpose, for example. As soon as operation has been started to such an extent that the carbon dioxide is separated in the gas purification unit, a switch to gas that contains carbon dioxide takes place for further, normal operation, and after the syntheses 10 and 11 are started up, additional gases are mixed in.

The following alternative process managements are possible:
- only one of the gases 10a, 11a, 12a, two of them or multiple fractions with different pressures,
- some of the in-feeds 4a, 5a, 5b with transfer gas 3d,
- the recirculated gas 13b that contains CO, $H_2$, CnHm only for 5c, then the injector 14 is no longer required, because of the release,
- the recirculated gas 13b that contains CO, $H_2$, CnHm also as a transfer gas 3d. Clearly more gas can be used, but the relaxation gas must be cleaned or collected in a buffer and compressed with the compressor 13, for example,
- transfer gas 3d is also used as a propellant gas 13a for the injector 14, because the gas has a higher pressure.

Aside from the exemplary embodiment shown, it can also be provided that the number of transfer containers can be greater, and that multiple compressors can be used for compressing multiple fractions that occur at different pressures.

The invention claimed is:

1. A method for supplying an entrained-flow gasification reactor with carbonaceous fuel for producing a gas that contains CO, $H_2$, and flue ash under pressure and at a temperature above the melting point of the ash, the method comprising steps of:
   providing an entrained-flow gasification reactor;
   supplying the entrained-flow gasification reactor with carbonaceous fuel;
   producing via the entrained-flow gasification reactor and the carbonaceous fuel in the entrained-flow gasification reactor the gas that contains CO, $H_2$, and flue ash;
   subjecting the gas to a plurality of treatment stages to form a waste gas;
   mixing the waste gas with $CO_2$ to form a mixed gas;
   compressing the mixed gas to form a recirculation gas; and
   conveying the carbonaceous fuel pneumatically into the entrained-flow gasification reactor using the recirculation gas;
   wherein said plurality of treatment stages comprises at least one synthesis stage, a CO conversion stage, a gas purification stage, a first synthesis stage, and a second synthesis stage; and
   wherein the recirculation gas contains at least 1 vol.-% of hydrocarbons and/or 1 vol.-% of hydrogen.

2. The method according to claim 1, wherein a further gas obtained during the plurality of treatment stages contains predominantly $CO_2$ and at least 10 ppm $H_2S$ and/or CO and is mixed into the recirculation gas.

3. The method according to claim 1, wherein the recirculation gas is used at least in part for conveying the carbonaceous fuel in a feed container, for building up pressure in the feed container and/or for fluidization of the carbonaceous fuel in the feed container.

* * * * *